(12) United States Patent
Landgraf (10) Patent No.: US 8,591,617 B2
(45) Date of Patent: Nov. 26, 2013

(54) POWDER COATING APPARATUS AND METHOD

(76) Inventor: Scott Landgraf, Buffalo, MN (US)

( * ) Notice: Subject to any disclaimer, the term of this patent is extended or adjusted under 35 U.S.C. 154(b) by 311 days.

(21) Appl. No.: 12/953,797

(22) Filed: Nov. 24, 2010

(65) Prior Publication Data

US 2011/0123713 A1    May 26, 2011

Related U.S. Application Data

(60) Provisional application No. 61/283,070, filed on Nov. 25, 2009.

(51) Int. Cl.
*B01D 39/00* (2006.01)
(52) U.S. Cl.
USPC .......... 55/385.1; 55/385.2; 55/431; 55/459.1; 55/467; 55/482; 95/413; 96/60; 96/243
(58) Field of Classification Search
USPC .......... 55/385.1, 385.2, 431, 459.1, 467–468, 55/472, 482, 487; 427/185; 406/121; 96/60, 243; 95/413
See application file for complete search history.

(56) References Cited

U.S. PATENT DOCUMENTS

| | | | | |
|---|---|---|---|---|
| 3,493,115 | A | * | 2/1970 | Koches .......... 210/238 |
| 5,156,603 | A | * | 10/1992 | Olsen .......... 604/323 |
| 6,743,005 | B1 | * | 6/2004 | Leemhuis .......... 418/171 |
| 7,150,585 | B2 | | 12/2006 | Kleineidam et al. |
| 7,163,359 | B2 | | 1/2007 | Moser |
| 7,481,605 | B2 | | 1/2009 | Kleineidam et al. |
| 7,543,764 | B2 | | 6/2009 | Haynes et al. |
| 2009/0180898 | A1 | * | 7/2009 | Fulkerson .......... 417/151 |

FOREIGN PATENT DOCUMENTS

| | | |
|---|---|---|
| EP | 0937004 | 4/2000 |
| EP | 0937004 B1 | 4/2000 |

* cited by examiner

*Primary Examiner* — Jason M Greene
*Assistant Examiner* — Karla Hawkins
(74) *Attorney, Agent, or Firm* — Mark A. Litman & Associates, P.A.

(57) ABSTRACT

A filter support casing and filter provides powder into a Bernoulli flow system. The system has an upper end and a lower end, the upper end having an opening therein. The filter support casing extends downward from the upper end. There is a filter supported within the casing. The filter support casing and the filter define an internal volume within both the filter support casing and the filter. The volume is exposed to the opening in the upper end and as later explained is flow connected into a gas stream that will carry particles and spray particles. The casing has at least two concentric elements, a first inner elements and a second outer element, that rotate with respect to each other and which slide with respect to each other. The two elements rotate about their concentric positions and slide along their lengths. The first inner element is contiguous (adjacent and/or touch and adjacent) with the filter. The first inner element encloses the filter with arms (fingers, extensions, posts, etc.) extending from a top of the first inner element to a bottom of the first inner element. The arms provide an open area between arms between the top of the first inner element and the bottom of the first inner element.

20 Claims, 7 Drawing Sheets

POWDER COATING APPARATUS AND METHOD

RELATED APPLICATION DATA

This application claims priority from U.S. Provisional Application Ser. No. 61/283,070, filed Nov. 25, 2009.

BACKGROUND OF THE INVENTION

1. Field of the Invention

The present invention relates to the field of powder coating, the application of powders as coatings onto surfaces, and apparatus used for the application of powders onto other surfaces by pneumatic or spray methods.

2. Background of the Art

In powder coating installations, the powder coating material has been usually pneumatically conveyed by the dilute phase method from a reservoir to a spray gun through a hose-like delivery line. Relatively large amounts of compressed air are needed to do this. Where filtering is performed on powders, the powders may tend to agglomerate, clog the filters, reduce the controlled rate of powder flow, and otherwise interfere with the coating operation.

Plug flow conveying or dense phase conveying has been used in which the powder coating material is cyclically conveyed either by gravity or by negative pressure into a chamber and then discharged from the chamber with compressed air and conveyed in the form of successive "plugs" through the delivery line to the spray application device. This provides a less desirable and non-steady state flow of materials. A device of the type is shown in EP 0 937 004 B1. This device has a cylindrical pump chamber, which is equipped with a discharge opening for the conveyed material at its lower end and a plate-like filter element that is impenetrable by the conveyed material at its upper end, by which the pump chamber can be alternately connected with a vacuum pump and with a source of compressed gas, to suck the conveyed material from a reservoir through a connection that opens into the pump chamber from the side for the purpose of filling the pump chamber, or to push the conveyed material through the discharge opening into a discharge line for the purpose of emptying the pump chamber. To allow exact metering of the conveyed material and at the same time a high discharge volume, the pump chamber should have a filling volume that is as small as possible, and it should be possible to fill it and empty it in an operating cycle that is as short as possible. To achieve the latter objective, however, the gas must be sucked from the pump chamber and fed into the pump chamber relatively quickly, which requires a pressure difference that is as large as possible between the inside of the pump chamber and the source of negative pressure or the source of compressed gas.

A more typical spray application system for powder coating comprises a powder reservoir over which a flow of air is directed, picking up powder from within the reservoir and directing it against a surface to be coated. Often a resource pipe or tube extends from the flow of air into the reservoir is used to collect and carry powder (often in a fluidized bed state) into the flow of air by Bernoulli effects. The use of filters to limit size ranges of particles is important, but again suffers from attendant problems of aggregation, filter clogging and the like.

U.S. Pat. No. 7,543,764 (Haynes) describes a nozzle for use in a cold spray technique is described. The nozzle has a passageway for spraying a powder material, the passageway having a converging section and a diverging section, and at least the diverging section being formed from polybenzimidazole. In one embodiment of the nozzle, the converging section is also formed from polybenzimidazole.

U.S. Pat. Nos. 7,481,605 and 7,150,585 (Kleineidam) describes a process and equipment for conveyance of powdered metal, especially during powder coating processes. A gas-permeable filter element is designed as a hollow cylinder in such a way that it forms a part of the cylindrical surface of the conveyance chamber. The idea is to increase the filter surface of the filter element and reducing the pressure difference between the outer and inner surface of the filter element at the same gas throughput, without increasing the volume of the chamber and thus adversely affecting the metering precision.

U.S. Pat. No. 7,163,359 (Moser) describes a transport system with several devices (1) for transporting powder, where each device (1) has a transfer chamber (3) into which a supply line (6) and a discharge line (8) for the powder open, and means to generate a negative pressure in the transfer chamber (3), where the means to generate a negative pressure in the device (1) has a piston (11) which is moveable in the transfer chamber.

SUMMARY OF THE INVENTION

A flow of air through a powder application gun travels over a reservoir of powder in a container. An access tube extends from the air flow into the reservoir. The access tube is connected to a filter and filter support case that is one element of the present invention.

Figure 3:
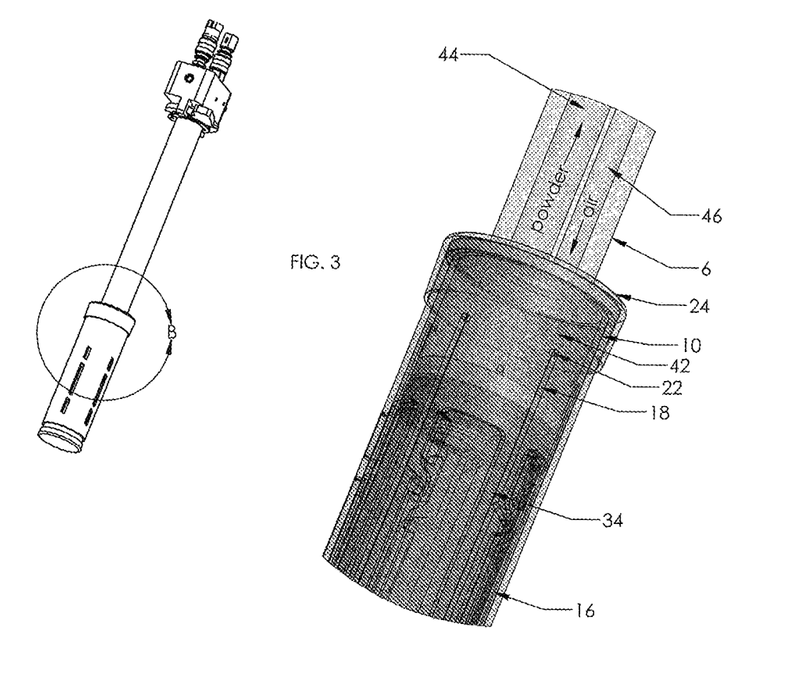

There is a filter support casing and filter that provides powder into a Bernoulli flow system. The filter support casing and filter has an upper end and a lower end, the upper end having an opening therein. The filter support casing extends downward from the upper end (the upper end being the end extending towards the Bernoulli flow system). There is a filter supported within the casing. The filter support casing and the filter define an internal volume within both the filter support casing and the filter. The volume is exposed to the opening in the upper end and as later explained is flow connected into a gas stream that will carry particles and spray particles. The casing has at least two concentric elements, a first inner elements and a second outer element, that rotate with respect to each other and which slide with respect to each other. The two elements rotate about their concentric positions and slide along their lengths. The first inner element is contiguous (adjacent and/or touch and adjacent) with the filter. The first inner element encloses the filter with arms (fingers, extensions, posts, etc.) extending from a top of the first inner element to a bottom of the first inner element. The arms provide an open area between arms between the top of the first inner element and the bottom of the first inner element. The second outer element in sliding and rotating relation with the first inner element and enclosing the first inner element with arms extending from a top of the second outer element to a bottom of the second outer element, the arms providing an open area between arms between the top of the second outer element and the bottom of the second outer element.

BRIEF DESCRIPTION OF THE FIGURES

FIG. 1 shows a complete insert system of a filter support casing connected through a pipe to a spray gun (not shown) Bernoulli effect flow tube.

FIG. 2 shows the system of FIG. 1 with the outer element slid to its most upward position against top section with the openings blocked by the inner element.

FIG. 3 shows a partial cutaway view of the inner top element and the tube.

DETAILED DESCRIPTION OF THE INVENTION

A filter support casing and filter provides powder into a Bernoulli flow system. A Bernoulli flow system is a configuration in which air flow along one direction (e.g., the line of movement of gas in a spray gun or conduit feeding the spray gun) draws in material from a side port, such as a reservoir for powder of other flowable material. This operation works on the Bernoulli principle in which it is recognized that increased flow speed reduces sideways pressure, thereby creating a reduced pressure or draw along side ports in a flow tube or any other flow system. The filter support casing and filter may be constituted by: a) an upper end and a lower end, the upper end having an opening therein; b) a filter support casing extending downward from the upper end; c) a filter supported within the casing; d) the filter support casing and the filter defining an internal volume within both the filter support casing and the filter; e) the volume exposed to the opening in the upper end; g) the casing comprising two concentric elements, a first inner elements and a second outer element, that rotate with respect to each other and which slide with respect to each other; f) the first inner element contiguous with the filter, and enclosing the filter with arms extending from a top of the first inner element to a bottom of the first inner element, the arms providing an open area between arms between the top of the first inner element and the bottom of the first inner element; and g) the second outer element in sliding and rotating relation with the first inner element and enclosing the first inner element with arms extending from a top of the second outer element to a bottom of the second outer element, the arms providing an open area between arms between the top of the second outer element and the bottom of the second outer element.

As will be later explained more thoroughly with respect to the Figures, the inner and outer elements (first and second) are above to move relative to each other. The sliding movement is similar to a telescoping movement, where the outer element slides over the surface coaxial to the inner element. The relative rotational movement means that as the two elements remain coaxial, one or both elements rotate about their axes. Although a minor overall effect, the relative rotation and sliding can break up aggregated particles extending over the filter. A more important effect of the rotation and sliding is the control of the air flow surface area from outside of the filter support casing across the surface of the filter. As the two elements are respectively rotated, for example, arms on the first inner element may block or open larger or smaller sections of openings between arms on the second outer element. Similarly, as the two elements slide relative to each other, either less surface area of an inner opening is exposed to air flow, more surface area is exposed to air flow and the like. These changes are at least in-part effected by the relative sizes, shapes and geometries of the arms and opening in the two elements.

The filter support casing and filter may have the first inner element as a continuous upper portion that completely surrounds an upper section of the filter and a continuous lower portion that continuously surrounds a lower section of the filter, with the arms providing an open area in the first inner element extend between the upper portion and the lower portion. The upper and lower portions do not have to be absolutely impermeable to be continuous, and as shown later, at least the upper portion may preferably have a vent or vent hole near its top (and a groove continuous to the vent to balance air pressures within the filter support casing (e.g., among spaces within the outer element, the inner element and the filter). Other than these groove(s) and vent holes, the upper and lower portions may be relatively or entirely solid and continuous.

At least one groove may be present in a radially outward face of the upper section of the first inner element and an opening is present near a top end of the groove that passes from the groove into flow contact with the volume. This opening or vent hole as previously mentioned can equilibrate or otherwise alter gas pressures (air pressure) outside the filter support casing, between elements of the filter support casing, and among elements of the filter support casing and the filter. The groove facilitates flow of air and distribution of pressure along the exterior surface of the first inner element and above the filter. The filter support casing and filter may have two sets of arms, a first set of arms extending from the upper portion to the lower portion and a second set extending from one portion towards another portion without contacting the another portion. The second set preferably extends from the upper portion towards the lower portion. The filter support casing and filter may have at least one groove is present in a radially outward face of the upper section of the first inner element extending along an arm and an opening is present near a top end of the groove that passes from the groove into flow contact with the volume. The filter support casing and filter may have a tube extends into the opening and below the upper end on the casing, the tube being connected to an air flow path in a spray gun. The filter support casing and filter of claim 4 wherein a tube extends into the opening and below the upper end on the casing, the tube being connected to an air flow path in a spray gun. The open area in the first inner element may be greater than the open area in the second outer element. The filter support casing and filter preferably extend into a fluidized bed of solid particles supported by flow of gas.

In accordance with the invention, benefits are achieved by designing the gas-permeable filter element as a hollow cylinder in such a way that it forms circumference within the interior cylindrical surface formed by the first inner element in the filter support casing. The filter may be adhered to the interior cylinder surface or be pressed against the surface my the natural elastic tension of the filter. The filter is preferably made of metal, although ceramics, composites and polymers may be used. The mesh size is dependent upon the particle sizes used in the process. The mesh size should be large enough to allow all individual particles through and likely some small degree of agglomerated particles, such as 2-5× the particle diameter. The screen may be designed to more precisely screen out particles in compositions having excessive variation, so the screen mesh size may be only 2-3× the desired particle size. The invention provides a simple means of increasing the filter surface of the filter element, and providing gas flow over that surface that maximizes surface utilization and even breaks up some agglomerated particles striking the filter surface. This will reduce the pressure difference between the outer surface of the filter support casing and the inner surface of the filter element at the same gas throughput. This is done without increasing the volume of the chamber and improves metering precision. Furthermore, as a filter element constructed as a section of the cylindrical wall, it allows axial conveyance of the powdered material through the chamber in a straight line. Moreover, no moving parts are required other than when adjusting flow by sliding or rotating the first inner and second outer element.

It is advantageous for the pore diameter of the filter material (e.g., a screen sintered material, etched material, fabric material, porous material, etc.) to be smaller than the smallest particle diameter of particles that are to be excluded from the powdered material being conveyed. Such mesh opening sizes might be at a maximum of 0.05 μm, a maximum of 0.07 μm, a maximum of 0.09 μm, a maximum of 0.2 μm, a maximum of 0.4 μm or generally smaller than 0.5 μm. With larger particles, larger mesh sizes, such a 1 μm or more could be used.

To ensure uniform admission of negative pressure and compressed gas, it is advantageous to surround the filter element with a housing, which is separated from the filter element by a cylindrical annular space formed between the inner first element and the second outer element. There will be space between the two elements to allow gas flow for a number of reasons in a number of different directions. For example, gas flow will enter the open areas in the outer second element and flow directly to the filter and/or flow around the interior surface of the outer second element and the exterior surface of the inner first element. Additionally, gas flow down the grooves in the inner first element would be between the inner first element and the inner surface of the outer second element. The gas flow down the grooves tends to moderate or otherwise adjust pressure both between the two elements and over the exterior surface of the filter element. The annular space can be adjusted by relative rotation of the inner and outer elements to expose different amounts of overlapping openings in the two elements.

Reference to the Figures will assist in a further understanding and appreciation of the presently disclosed novel technology. Identical numbers refer to same elements in different figures.

Figure 1:
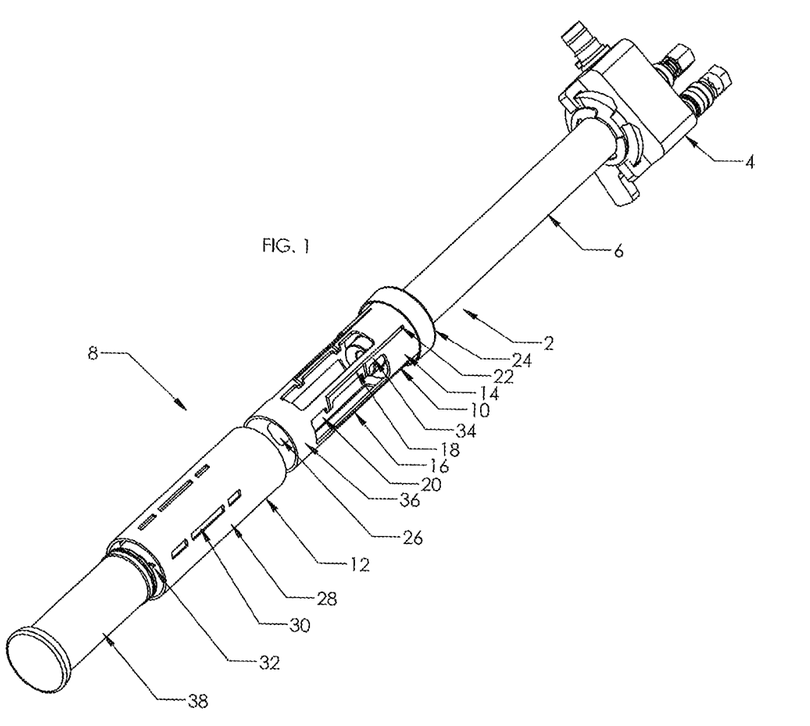

FIG. 1 shows a complete insert system 2 of a filter support casing 8 connected through a pipe 6 to a spray gun (not shown) Bernoulli effect flow tube 4. The filter support casing 8 has a first inner top portion 10 and a second outer lower portion 12 with screen 38 extending therefrom. The first inner section 10 has a top section 24 and a continuous top portion 14. The continuous top portion 14 is shown with a pressure moderating opening 22 and a surface groove 18 extending down an arm 34 in a first set of arms. Also shown is a lower continuous portion 36 defining an opening 26 and an opening 20 defined by the first set of arms 34 and the second set of arms 16. FIG. 1 also shows a second outer element 12 having its own set of arms 28 which define second openings 30 and an inner volume 32. The two elements 10 and 12 are shown separated, but are used by sliding the second element 12 over the first element 10. The second outer element 12 can slide and rotate freely about the inner element 10, with limits on the level of sliding being established by the top section 24. It can also be seen that by rotating and sliding the outer element 12, the amount of exposure of the larger opening 20 in the inner element 10 can be effected.

Figure 2:
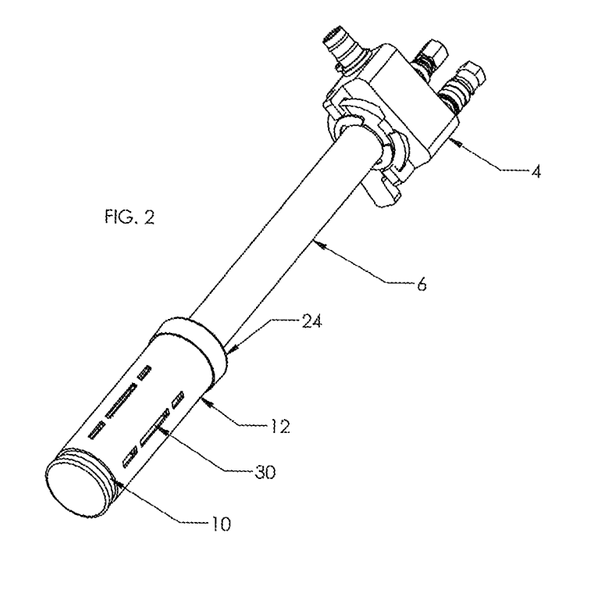

FIG. 2 shows the system 2 of FIG. 1 with the outer element 12 slid to its most upward position against top section 24 with the openings 30 blocked by the inner element 10. Although not shown, an O-ring may be positioned below the top section 24 to absorb any impact and reduce wear on the insert 2.

FIG. 3 shows a partial cutaway view of the inner top element 10 and the tube 6. The tube 6 is shown with ports 44 for carrying powder upward from a reservoir (not shown) and 46 for allowing air flow or directing air flow down into the reservoir (not shown). In addition to the openings 22 on the grooves 18 is shown a second or alternative distinct opening 42 for venting air to an inner region of the inner element 10.

Figure 4:
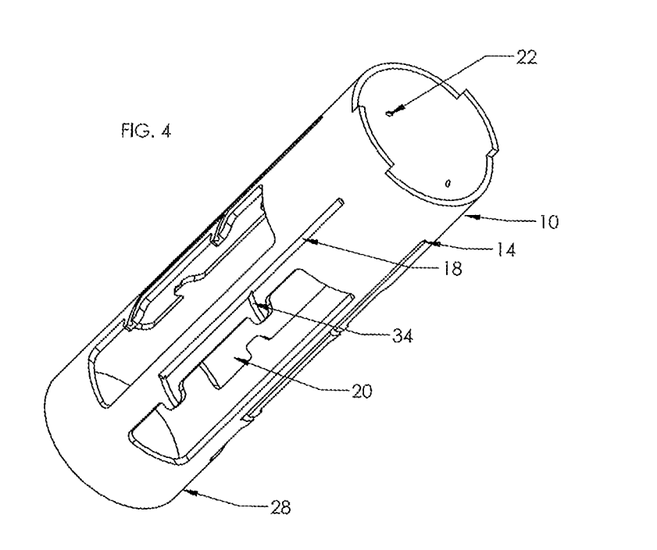
FIG. 4 shows a perspective view of the first inner element emphasizing a clear showing of the arms and, the groove, the upper continuous portion, the opening and the lower continuous portion.

FIG. 4 shows a perspective view of the first inner element 10 emphasizing a clear showing of the arms 16 and 34, the groove 18, the upper continuous portion 14, the opening 20 and the lower continuous portion 28.

Figure 5:
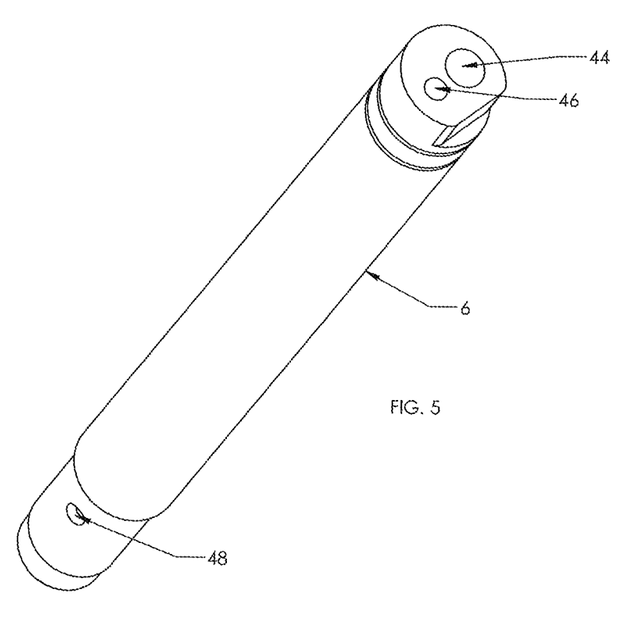
FIG. 5 shows a perspective view of the tube with the powder flow port or cannula and the air flow port or cannula. Pressure ventilation moderation openings are also shown.

FIG. 5 shows a perspective view of the tube 6 with the powder flow port or cannula 44 and the air flow port or cannula 46. Pressure ventilation moderation openings 48 are also shown.

Figure 6:
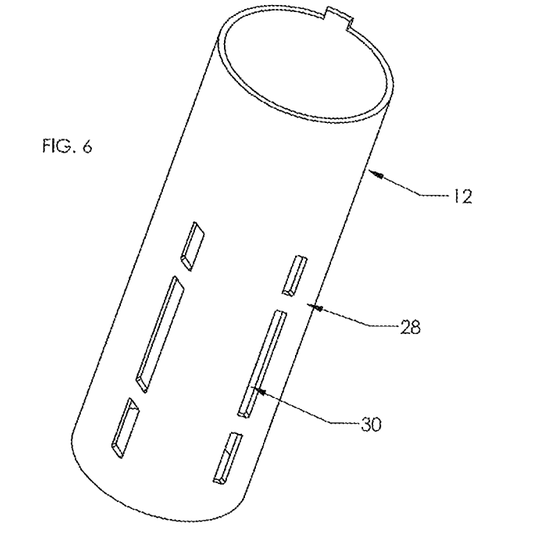
FIG. 6 shows a perspective view of the second outer element emphasizing a clear showing of the arms and the opening.

FIG. 6 shows a perspective view of the second outer element 12 emphasizing a clear showing of the arms 28 and the opening 30.

A method of practicing technology within the scope of novel subject matter described herein can include a method of applying powder to a surface through a spray gun. Steps would include those of inserting a filter support casing and a filter into a reservoir of particle.

The filter support casing and filter could be: an upper end and a lower end, the upper end having an opening therein; a filter support casing extending downward from the upper end; a filter supported within the casing; the filter support casing and the filter defining an internal volume within both the filter support casing and the filter; the volume exposed to the opening in the upper end; the casing comprising two concentric elements, a first inner elements and a second outer element, that rotate with respect to each other and which slide with respect to each other; the first inner element contiguous with the filter, and enclosing the filter with arms extending from a top of the first inner element to a bottom of the first inner element, the arms providing an open area between arms between the top of the first inner element and the bottom of the first inner element; the second outer element in sliding and rotating relation with the first inner element and enclosing the first inner element with arms extending from a top of the second outer element to a bottom of the second outer element, the arms providing an open area between arms between the top of the second outer element and the bottom of the second outer element. A next step could include fluidizing particles within the reservoir and then drawing particles from the fluidized bed through the open area in the first inner element and then through the filter into the volume; and drawing particles from the volume into spray flow of a spray gun by reducing gas pressure above the volume.

The rate of flow of particles from the fluidized bed through the open area in the first inner element and then through the filter into the volume can be changed by relatively rotating the first inner element and the second outer element. The gas pressure between the first inner element and the second outer element can be altered by air flow passing along a groove in a surface between the first inner element and the second outer element. Agglomerated particles in contact with an outer surface of the filter can be or are separated into smaller groups of particles than the agglomerated particles by gas flow over the surface of the filter.

The filter element (not shown) may simply be a screen or porous film that is inserted and at least temporarily secured to the inner surface of the first inner element 10 of the filter support casing. The screen may be held by its own tension, be secured in a frame inserted into the volume 26 of the first inner element 10, may be slid into grooves, may have engaging members (screws, snaps, clip, etc.) to secure the screen, or adhesively attached.

Figure 7:
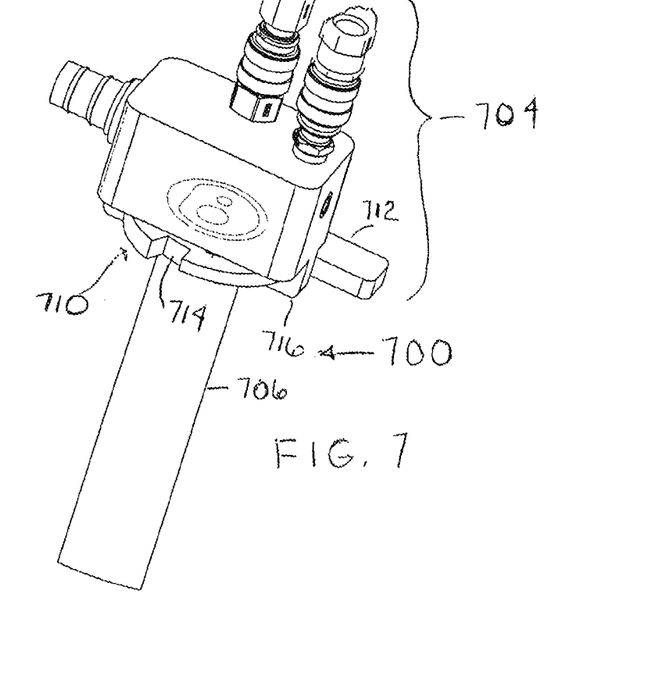
FIG. 7 shows another variant of an upper portion of an insert system within the generic concepts of the present invention.

FIG. 7 shows another variant of an upper portion 700 of an insert system within the generic concepts of the present invention. The previously described tube (6 in earlier figures) is shown as 706. The spray head system 704 is shown with a locking system 710 that locks the tube 706 to the spray head 704. The locking mechanism 710 is a simple swivel or rotating locking system manipulated by a handle 712 which rotates the locking system 710 which has an insert 714 that slides onto and out of a tooth 716 when the insert or groove 714 is rotated to be aligned with the tooth 716.

Figure 8:
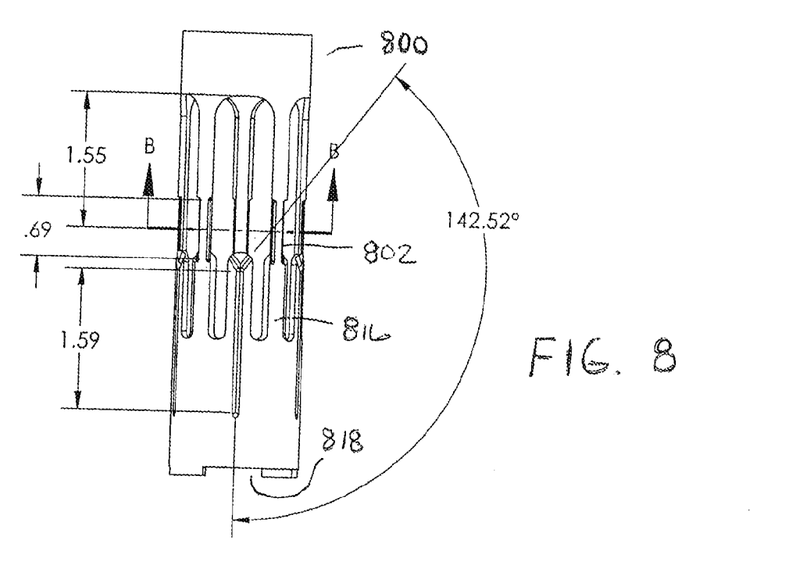
FIG. 8 shows another variant of an outer element portion of an insert system within the generic concepts of the present invention.

FIG. 8 shows another variant of an outer element portion 800 of an insert system within the generic concepts of the present invention. Dimensions of the outer element portion are shown, as well as angle measurements od 142.52° for grooves 802 machined or etched into the arms 816 and also partial channels or beveling 802 etched or machined into the mid regions of the arms 816 to further assist in the allowance of exterior air pressure that is more positive than interior air pressure to flow from outside the outer element portion 800 towards the interior screen (not shown) during use of the system. The additional air flow zone created by the beveling or grooving 802 has been found to better control relative exterior and interior exchange of air flow, maintain a regular level of air pressure differential between the exterior of the system and the interior of the system and further reduce particle buildup and blockage of the system. The beveling can be further described where the filter support casing and filter extend into a fluidized bed of solid particles supported by flow of gas and the arms in the second outer element have at least some areas of reduced thickness (e.g., the beveling) adjacent openings between adjacent arms.

The bottom 818 of the outer element portion 800 could be left open (e.g., with a snap on or screw on cap, not shown) to allow removal of the screen (not shown), or a permanent cap (not shown) could be affixed to the bottom of the outer element portion 800 so that the entire system would have to be replaced from the end of the tube 706 in FIG. 7.

What is claimed:

1. A filter support casing and filter for providing powder into a Bernoulli flow system, the filter support casing and filter comprising:
    an upper end and a lower end, the upper end having an opening therein;
    a filter support casing extending downward from the upper end;
    a filter supported within the casing;
    the filter support casing and the filter defining an internal volume within both the filter support casing and the filter;
    the volume exposed to the opening in the upper end;
    the casing comprising two concentric elements, a first inner elements and a second outer element, that rotate with respect to each other and which slide with respect to each other;
    the first inner element contiguous with the filter, and enclosing the filter with arms extending from a top of the first inner element to a bottom of the first inner element, the arms providing an open area between arms between the top of the first inner element and the bottom of the first inner element;
    the second outer element in sliding and rotating relation with the first inner element and enclosing the first inner element with arms extending from a top of the second outer element to a bottom of the second outer element, the arms in the first inner element providing an open area between arms between the top of the second outer element and the bottom of the second outer element, wherein relative rotation between the first inner element and the second outer element alters gas pressure between the first inner element and the second outer element.

2. The filter support casing and filter of claim 1 wherein the first inner element comprises a continuous upper portion that completely surrounds an upper section of the filter and a continuous lower portion that continuously surrounds a lower section of the filter, with the arms providing an open area in the first inner element extend between the upper portion and the lower portion.

3. The filter support casing and filter of claim 2 wherein at least one groove is present in a radially outward face of the upper section of the first inner element and an opening is present near a top end of the groove that passes from the groove into flow contact with the volume.

4. The filter support casing and filter of claim 1 wherein the first inner element has two sets of arms, a first set of arms extending from the upper portion to the lower portion and a second set extending from one portion towards another portion without contacting the another portion.

5. The support casing of claim 4 wherein the second set extends from the upper portion towards the lower portion.

6. The filter support casing and filter of claim 2 wherein at least one groove is present in a radially outward face of the upper section of the first inner element extending along an arm and an opening is present near a top end of the groove that passes from the groove into flow with the volume, the groove allowing air flow along the groove into the volume.

7. The filter support casing and filter of claim 1 wherein a tube extends into the opening and below the upper end on the casing, the tube being connected to an air flow path in a spray gun.

8. The filter support casing and filter of claim 2 wherein a tube extends into the opening and below the upper end on the casing, the tube being connected to an air flow path in a spray gun perpendicular to the tube.

9. The filter support casing and filter of claim 3 wherein a tube extends into the opening and below the upper end on the casing, the tube being connected to an air flow path in a spray gun perpendicular to the tube.

10. The filter support casing and filter of claim 6 wherein a tube extends into the opening and below the upper end on the casing, the tube being connected to an air flow path in a spray gun perpendicular to the tube.

11. The filter support casing and filter of claim 1 wherein the filter support casing and filter extend into a fluidized bed of solid particles supported by flow of gas.

12. The filter support casing and filter of claim 3 wherein the filter support casing and filter extend into a fluidized bed of solid particles supported by flow of gas.

13. A method of applying powder to a surface through a spray gun comprising the steps of inserting a filter support casing and a filter into a reservoir of particle; the filter support casing and filter comprising: an upper end and a lower end, the upper end having an opening therein; a filter support casing extending downward from the upper end; a filter supported within the casing; the filter support casing and the filter defining an internal volume within both the filter support casing and the filter; the volume exposed to the opening in the upper end; the casing comprising two concentric elements, a first inner elements and a second outer element, that rotate with respect to each other and which slide with respect to each other; the first inner element contiguous with the filter, and enclosing the filter with arms extending from a top of the first inner element to a bottom of the first inner element, the arms providing an open area between arms between the top of the first inner element and the bottom of the first inner element; the second outer element in sliding and rotating relation with the first inner element and enclosing the first inner element with arms extending from a top of the second outer element to a bottom of the second outer element, the arms providing an open area between arms between the top of the second outer element and the bottom of the second outer element; fluidizing particles within the reservoir; drawing particles from the fluidized bed through the open area in the first inner element and then through the filter into the volume; and drawing particles from the volume into spray flow of a spray gun by reducing gas pressure above the volume.

14. The filter support casing and filter of claim 6 wherein the filter support casing and filter extend into a fluidized bed of solid particles supported by flow of gas and the arms in the second outer element have at least some areas of reduced thickness adjacent openings between adjacent arms.

15. A filter support casing and filter for providing powder into a Bernoulli flow system, the filter support casing and filter comprising:
   an upper end and a lower end, the upper end having an opening therein;
   a filter support casing extending downward from the upper end;
   a filter supported within the casing;
   the filter support casing and the filter defining an internal volume within both the filter support casing and the filter;
   the volume exposed to the opening in the upper end;
   the casing being contiguous with the filter, and enclosing the filter with arms extending from a top of the casing to a bottom of the casing,
   the arms providing an open area between arms between the top of the casing and the bottom of the casing;
   a second outer element surrounding the first inner element and enclosing the first inner element to form an air passage between the second outer element and the casing.

16. The filter support casing and filter of claim 15 wherein the casing comprises a continuous upper portion that completely surrounds an upper section of the filter and a continuous lower portion that continuously surrounds a lower section of the filter, with the arms providing an open area in the first inner element extend between the upper portion and the lower portion.

17. The filter support casing and filter of claim 15 wherein at least one groove is present in a radially outward face of the upper section of the casing and an opening is present near a top end of the groove that passes from the groove into flow contact with the volume through the filter, the groove allowing air flow along the groove into the volume.

18. The filter support casing and filter of claim 15 wherein the filter support casing and filter extend into a fluidized bed of solid particles supported by flow of gas.

19. The filter support casing and filter of claim 15 wherein a tube extends into the 1pening and below the upper end on the casing, the tube being connected to an air flow path in a spray gun perpendicular to the tube.

20. The filter support casing and filter of claim 17 wherein a tube extends into the 1pening and below the upper end on the casing, the tube being connected to an air flow path in a spray gun perpendicular to the tube.

* * * * *